Aug. 29, 1933.    H. W. DROSTE ET AL    1,924,840
METHOD FOR THE COMPENSATION OF CAPACITY UNBALANCES IN THE
GROUPS OF CORES OF TELEGRAPH AND TELEPHONE CABLES
Filed Feb. 15, 1932    2 Sheets-Sheet 1

HANS WALTER DROSTE,
HANS KIRCHDORFER
Inventors

BY Haseltine Lake
ATTORNEYS.

Aug. 29, 1933.  H. W. DROSTE ET AL  1,924,840
METHOD FOR THE COMPENSATION OF CAPACITY UNBALANCES IN THE
GROUPS OF CORES OF TELEGRAPH AND TELEPHONE CABLES
Filed Feb. 15, 1932  2 Sheets-Sheet 2
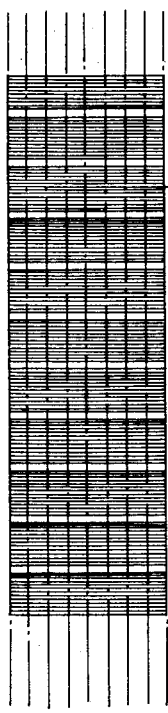
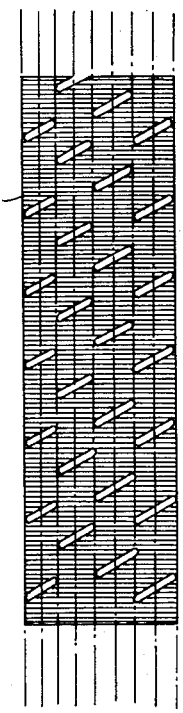
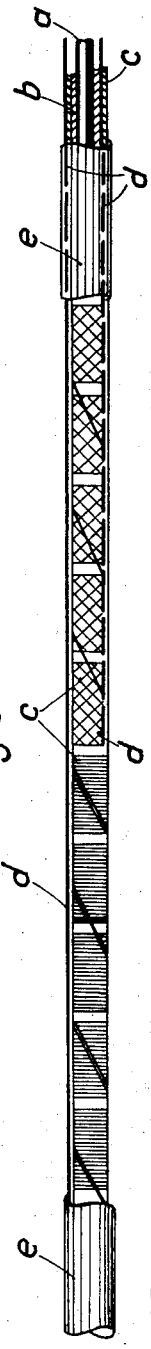
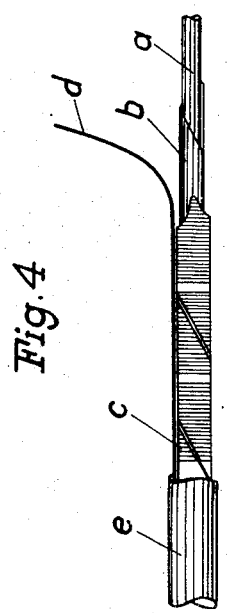
Hans Walter Droste,
Hans Kirchdörfer
Inventors
BY: Haseltine Lake & Co.
ATTORNEYS.

Patented Aug. 29, 1933

1,924,840

UNITED STATES PATENT OFFICE 1,924,840

METHOD FOR THE COMPENSATION OF CAPACITY UNBALANCES IN THE GROUPS OF CORES OF TELEGRAPH AND TELEPHONE CABLES

Hans Walter Droste, Nuremburg, and Hans Kirchdörfer, Malmsbach, near Nuremburg, Germany Application February 15, 1932, Serial No. 593,166, and in Germany June 7, 1930

12 Claims. (Cl. 179—79)

It is known that the capacity unbalances in the groups of cores of telegraph and telephone cables can be obviated by means of crossing or by the insertion of suitably dimensioned compensation condensers.

The crossing method is subject, however, to the disadvantage that of the lengths of cable following one another, only those twisted groups can be connected together the couplings of which neutralize one another. For this reason it is impossible to join up the twisted groups at the connecting points in the way that are juxtaposed. The distinct recognition of the connections, therefore becomes rather difficult, thus giving rise to mistakes in repair work. Furthermore, the balancing section must be subdivided into several short partial sections in order to increase the probability of compensating the couplings of a certain number of these partial sections as completely as possible by the opposite couplings of the remaining partial sections of the compensating sector. A greater number of connections must thus be made than in the case of a method where crossings are avoided. More time and material are, of course also required. Furthermore, during the work of such crossing, the progress of the work on the entire compensating sector is dependent upon the working speed of the slowest worker attending to the connection of two partial sections.

Although compensation by additional condensers does not entail these draw backs, it has, however the disadvantage that in this case, at pointed positions, additional connecting means must be provided which are expensive and whose properties are easily variable in regard to capacity, insulation resistance, etc. Furthermore the installation of these additional condensers requires a great deal of time for preliminary work, since comparatively long supply lines must first be soldered to the cables and the additional condensers connected to the end of said lines.

Now, the present invention is based on a method by which it is possible to join up the various twisted groups with ease and by which the partial capacities are varied by means of connecting devices in the cores between conductors and core insulation, without it being necessary to increase the size of the cable due to the special construction of the core.

For this purpose, conductive or semi-conductive layers are arranged between the conductors and the core insulation of each twisted group. By means of these layers each of the partial capacities between two conductors (Figure 1) is subdivided into three connected in series, of which one or more, but generally the middle one, is cut out by short-circuiting (Figure 2). Thus, the partial capacity between the conductors is increased.

In the accompanying drawings forming part hereof,

Fig. 4 illustrates the construction of a cable embodying the invention in a practical form.

Fig. 5 is a modification of the same.

Fig. 6 illustrates a form of paper tape which may be used for wrapping the core of the cable shown in Figs. 4 and 5.

Fig. 7 illustrates another form of such tape.

Throughout the views, the same reference numerals indicate the same or like parts.

Figure 1:
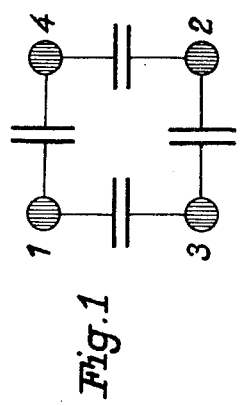
Fig. 1 is a diagrammatic representation of a multi-conductor cable in which there are four partial capacities indicated.

In Figure 1 only four partial capacities are represented which have the greatest influence upon the cross talk. It may be assumed that the partial ground capacities are of no importance for the cross talk. In fact, this is not the case but the partial ground capacities can be included in the partial capacities.

Figure 2:
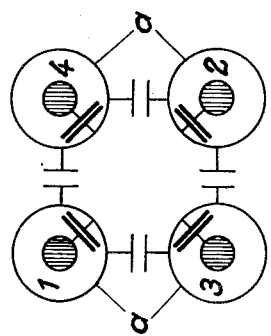
Fig. 2 is a similar representation of four insulated conductors having exterior conducting sheaths or tubes, while three partial capacities for each conductor with respect to each adjacent conductor by means of its sheath being shown.

In Figure 2, $a$ denotes the outline of four conducting or semi-conducting layers or tubes in the centers of which the conductors 1, 2, 3, and 4 are provided. The one partial capacity, for example, between the conductor 1 and the conductor 4 which may be designated by $C_{14}$ is subdivided into three partial capacities by the fully conducting or semi-conducting layer or tube $a$, e. g.

1. Into the partial capacity between the conductor 1 and the tube $a$ arranged round 1, 2. Into the partial capacity between the tube $a$ arranged around the conductor 1 and the tube $a$ around conductor 4, 3. Into the partial capacity between the last mentioned tube and the conductor 4.

Due to the presence of the fully conducting or semi-conducting layers $a$ the capacity between 1 and 4 remains first unvaried. Only when one of the three enumerated partial capacities is short circuited, does an increase of $C_{14}$ take place. If the partial capacity between the conductor 1 and the tube $a$ surrounding the conductor 1, would be short circuited, besides the capacity $C_{14}$, the partial capacity $C_{13}$ would also be varied. It is desirable however that the partial capacities can be varied independent of each other. This is readily possible if the middle capacity of the three partial capacities disposed between two continuously conducting layers $a$ in Figure 2 is bridged by a short circuit.

As the capacity unbalances between the groups of cores in modern telegraph and telephone cables are not large, it suffices if the conductive layers are only disposed on a few meters of the commencement and end or only at the end of each core. If the conductive layers at the end are drawn out of the core, the increase in capacity effected by its short-circuiting may be graduated as desired.

The layers can consist of several thin conductors insulated from one another, which are wound stratiformly round the cores, or of conductive or semi-conductive tubes. The tubes are preferably wound out of metallized or graphited tapes. Now, generally speaking, it will not be possible to draw the tubes out of the conductors twisted into groups, without damaging them. Hence, it is more advisable to subdivide the tubes into rings which are separated from one another by means of non-conductive interstices. The conductive bond between the individual rings is preferably effected by means of one or more wires in contact with them, so-called "draw-wires" or conductive tapes. If it is desired to increase the partial capacity between two cores of the same or different groups, their draw-wires are joined together. If the draw-wires are drawn out at the ends of the cores, one ring after another is cut out. As each ring is cut out, the increase in capacity effected by the short-circuiting of the draw-wires is decreased by a small amount. The possibility is thus provided of effecting very finely graduated variations in capacity.

The partial capacity of a core to earth can be increased in a corresponding way. The draw-wire of the relative core must in that case be connected with a conductor having earth potential.

Figure 4 shows an example of a core of this kind, $a$ is the conductor, $b$ a paper wound round it, $c$ a paper wound over this and having a conductive or semi-conductive coating, which covers the paper tape (Figure 4) in such a manner that after the winding operation conductive or semi-conductive rings which are insulated from one another are formed, $d$ a wire which constitutes the electrical bonding between the rings, and $e$ the upper paper layer of the wire provided with the wire designation and which further serves to press the wire $d$ tightly upon the fully conducting and half conducting rings arranged upon $c$.

In order that one group of quads consisting of the conductors 1 ... 4 may become uncoupled, one or more of the four partial capacities must be increased between the conductors 1 and 3, 1 and 4, 2 and 3 and 2 and 4. In the most unfavourable case, each of the two partial capacities between one core and two others must be increased. For this case, each core must include two layers coupled together with as little capacity as possible and "two draw-wires" not connected together. It is advisable to withdraw the draw-wires as far as possible, in order to keep the increase in working capacity low, which is conditioned by means of the bonding of the layer.

Figure 5 shows an example. Here, $a$ signifies the conductor, $b$ a paper wound round it, $c$ the paper tube with the conductive or semi-conductive rings. This is formed in such a manner, that in one section the coating is on the inside and in the next section on the outside. Accordingly the one draw-wire $d$ is situated between the conductor and this tube, the other between the tube and the external core insulation, while $e$ is the upper paper layer of the wire which is provided with the wire designation.

The adjustment can be effected in the factory for each individual cable or with one or more lengths of an adjustment section. It can, of course, also be carried out on the cable-way after laying.

The most advisable procedure is to carry out a coarse adjustment of a complete adjustment section on a length in the factory, following which a supplementary fine adjustment is effected on another length on the cable-way after laying.

Figure 3:
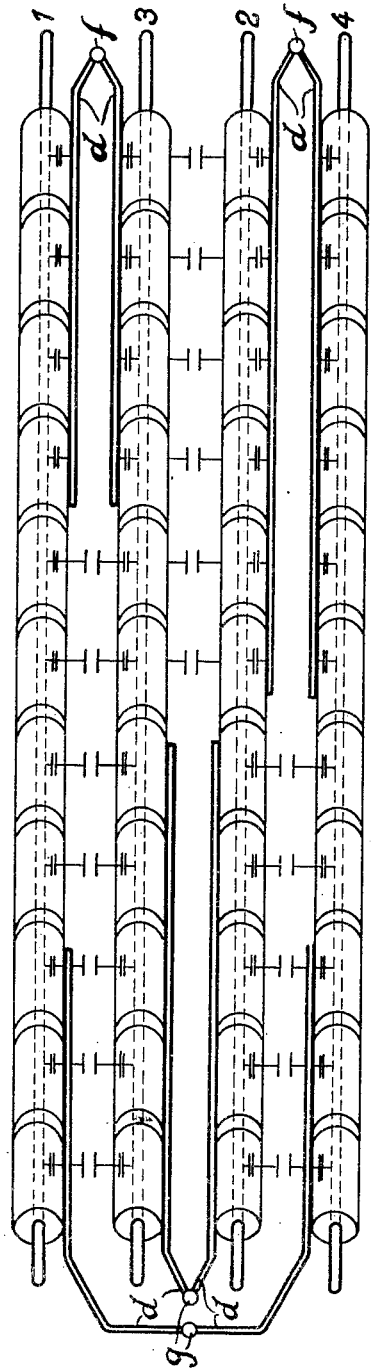
Fig. 3 is a view showing how such conductors may be interconnected in actual practice.

In many cases it will be advisable to arrange in the center of a compensating sector consisting of one or more normal cables, several short lengths of cable of 8 to 15 m. long containing the adjustment cores described, and to join them with these by means of ordinary junction boxes. In this case, two draw-wires will be arranged over the conductive or semi-conductive layer, of which the one will be drawn out towards one end and the other towards the other end. In Figure 3, a four wire group of such a short cable piece to be termed a "counter coupling cable" is represented. The capacities between conductors and rings as well as those between the rings are illustrated by means of corresponding condensers. However, here the capacities between the rings and the enveloping tube around the conductor 1, as well as the rings of the tube around the conductor 4 have not been shown for the reason of a more simplified illustration. For instance, if it be required to increase the partial capacity between conductors 1 and 3 and 1 and 4, then the draw-wire of the core 1 is connected at the one end of the short adjustment cable with that of the core 3, and at the other end the second draw-wire of the core 1 with one of the two draw-wires of the core 4 (Figure 3).

For the case shown in Figure 3, the partial capacities $C_{13}$ and $C_{24}$ are increased by connecting the retractable connecting wires $d$ as at $f$ at the right of the figure, and the partial capacities $C_{14}$ and $C_{23}$ are increased by short circuiting the respective connecting wires $d$ as at $g$ at the left of the figure.

If it is desired to alter the partial capacities of the cores of neighboring groups, it is best to arrange in the adjustment section a further mutual coupling cable, which must include so many twisted groups with so many draw-wires insulated from one another, that all the necessary partial capacities can be varied by connecting the draw-wires of the various twisted groups.

The paper tapes required for these cores, with conductive or semi-conductive coating, may be obtained, say, by pasting transverse strips of thin metal foil on to a paper track by means of an adhesive (Figure 6), or, by using a stencil, to roll on and polish in stripes of graphite, carbon or the like. The pasted over track is cut up into tapes by means of a paper-cutting machine. The metal coatings separated from one another may also be produced by means of a spraying process, which is carried out either on the uncut paper track or even on the core in the covering machine.

The following method of production has given good satisfaction:

The metal foil, in which holes are punched displaced against one another (Figure 7), is joined to a non-conductive base. The whole track is then cut with a cutting machine in such a manner, that tapes of the non-conductive base are produced, having transverse stripes of metal foil.

What we claim and desire to secure by Letters Patent of the United States is:—

1. In a telegraph or telephone cable having at least one group of conductor cores, means for compensating the capacity unbalances, in said cores, including two cores in said group whose partial capacity is subdivided into several partial capacities, means connecting said partial capacities in series comprising insulated layers which are at least semi-conductive and disposed between each conductor of said two cores and the insulation thereof, and means short-circuiting one or more of said partial capacities in order to alter said first partial capacity of said two cores.

2. In a telegraph or telephone cable having several groups of conductor cores, means for compensating the capacity unbalances in the groups of said cores, including two individual cores in two of said groups, whose partial capacity is subdivided into several partial capacities, means connecting said partial capacities in series comprising insulated layers which are at least semi-conductive and disposed between each conductor of said two cores and the insulation thereof, and means short-circuiting one or more of said partial capacities in order to alter said first partial capacity of said two cores.

3. A cable according to claim 1 wherein the insulated layer which is at least partly conductive and serves as connecting means comprises tubes which are provided with more or less conductive coatings.

4. In a telegraph or telephone cable having at least one group of conductor cores, means for compensating the capacity unbalances in said cores, including means subdividing the partial capacity of one or more of said cores comprising layers on one or more of said cores, each of said layers being associated with a single core only, said layers being at least semi-conductive and capable of being shortened at will in order to gradually vary the capacity of said core or cores.

5. In a telegraph or telephone cable having at least one group of conductor cores, means for compensating the capacity unbalances in said cores, including means subdividing the partial capacity of one or more of said cores comprising a layer upon such core or cores which is at least semi-conductive and subdivided into mutually insulated rings, and means for varying the capacity of said core or cores containing a common conductive bond in the form of a conductor resting against said rings and adapted to be withdrawn from the cores of said cable at will, so that within the core each ring can be separately disconnected.

6. In a telegraph or telephone cable having at least one group of conductor cores, means for compensating the capacity unbalances in said cores, including means subdividing the partial capacity of several of said cores, comprising a layer upon each such core which is at least partially conductive, which conductive layers are provided with mutual minimum capacity coupling and with individual bonding conductors which are insulated from each other and adapted to be variously withdrawn from said cores in order to properly vary the partial capacities between the conductors of said cores and other conductors or the ground.

7. A cable including a plurality of adjustment sections, each section having a short section of cable according to claim 4 interposed in the center of said section whose capacity couplings are thereby adapted to be varied.

8. In a telephone or telegraph cable having a plurality of adjustment sections including insulated conductor cores, means for compensating the capacity unbalances in said cores, including layers on one or more of said cores, each of said layers being associated with a single core only, said layers being at least partially conductive and applied in the form of a coating which is composed of strips of metal overlying the non-conductive exterior of said core and disposed transversely to the long dimension of the cable.

9. In a telephone or telegraph cable having at least one group of twisted conductor cores, means for compensating the capacity unbalances in said cores, including a layer applied to each core which is at least partially conductive, which layers are each provided with mutual minimum capacity coupling means and an individual bonding conductor which is capable of being withdrawn to any extent at will from the layer with which it is associated in order to vary the capacity of the core within said layer, the bonding conductors being insulated from each other and from the conductors within said cores, and means for further modifying the capacity of said cores.

10. In a telephone or telegraph cable having a plurality of groups of conductor cores, means for compensating the capacity unbalances in said cores, including layers individually applied to said cores which are at least partially conductive, mutual capacity coupling means associated with the cores and conductive layers in each group, bonding conductors individually associated with said conductive layers and adapted to be individually withdrawn from the same to various degrees in order to vary the capacity of said cores, and means for varying the partial capacities between the conductors of various groups thereof, including a mutual coupling cable made up of various members of said bonding conductors which are variously connected together in groups.

11. In a telephone or telegraph cable having at least one group of conductor cores, means for compensating the capacity unbalances between the conductors in said group, including insulating tubular layers on and enveloping one or more of said cores, each of said layers being associated with a single core only, said layers being rendered at least partly conductive by means of conductive material mechanically applied to said layers and polished thereon so as to adhere firmly.

12. In a telephone or telegraph cable having a plurality of conductor cores, means for compensating the capacity unbalances between the conductors, including a layer applied to each core which is at least partly conductive, which layers are provided with mutual minimum capacity coupling means, and means for varying the partial capacities between said conductors including a mutual coupling cable consisting of a plurality of insulated conductors which are individually associated with said conductive core layers and adapted to be individually withdrawn to various extents from the same, at will.

HANS WALTER DROSTE.
HANS KIRCHDÖRFER.